United States Patent Office 2,953,582
Patented Sept. 20, 1960

2,953,582
4-CHLORO-ADRENOSTERONE

Bruno Camerino, Milan, Italy, assignor to Società Farmaceutici Italia, a corporation of Italy No Drawing. Filed Oct. 26, 1956, Ser. No. 618,441

Claims priority, application Italy Apr. 23, 1956

1 Claim. (Cl. 260—397.3)

This invention relates to a new class of steroids characterized by high anabolic activity coupled with low androgen activity.

The herein claimed compounds are prepared by a modification of the process disclosed in the copending application of July 19, 1956, Serial No. 598,754, now abandoned, entitled "New Steroid Hormone Derivatives Substituted in the 4-Position and Method of Preparing Same" of which this application is a continuation-in-part. The compounds disclosed in said copending application are prepared by reacting 4,5-epoxy-3-keto-steroids of the general formula

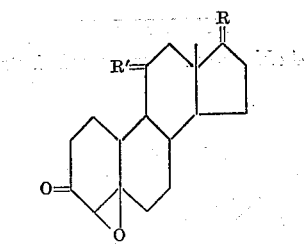

wherein R may represent =O, (H)OH and (CH₃)OH, and R' represents H₂, =O and (H)OH with mineral acid in an organic solvent.

The compounds obtained according to this invention have the general formula

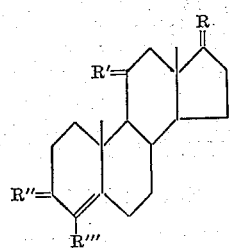

wherein R represents =O, (H)OH, (CH₃)OH and (H)OR^IV, R' represents H₂, =O and (H) OH, R" represents =O, (H)OH, (H)OR^IV, =NOH and
=NNHCSNH₂

R''' represents F, Cl and R^IV represents acyl and alkoxy.

According to the aforementioned, copending patent application, steroids wherein R''' represents F or Cl are prepared from only the β-form of 4,5-epoxides.

We have now found that steroids of this type can be also obtained from the α-form of 4,5-epoxides upon treating with halogenhydric acids in chloroform solution or in a chloroform solution containing 10% absolute ethanol. Moreover, if R''' is to become Cl, it is sufficient to heat the epoxide with a chloroform solution of pyridinium chloride.

According to the present invention, it is therefore possible to prepare 4-chloro and the 4-fluoro-steroids directly from a mixture of 4,5β- and 4,5α-epoxides obtained by treating a 3-keto-Δ⁴-steroid with alkaline hydrogen peroxide. Consequently, the process results in a substantial increase in yield, coupled with a simplification of the operations.

The compounds claimed in the present invention display strong anabolic activity on proteins, while being devoid of any substantial androgen activity. Therefore, they are of great importance in human and veterinary medicine. Anabolic as well as androgen activity are always jointly present in steroids that have been hitherto used in anabolitic therapy. Now we are able to provide products that do not produce any substantial androgen effect.

Therefore, it is possible to take advantage of the anabolic activity of these compounds without stimulating the sexual activity and this property is particularly useful for the treatment of decay, oseoporosis, emaciation, convalescences, premature newborns, underdevelopment, senility.

In addition, the products of the present invention also exhibit the other properties of previously known anabolic substances on the basis of which they have been used in treating certain ovary malfunctions, etc.

The following examples illustrate the present invention without limiting its scope.

EXAMPLE 1

4-chloro-testosterone 15 g. of a mixture of 4β,5-epoxy-etiocholane-17β-ol-3-one and 4α,5-epoxy-androstane-17β-ol-3-one, dissolved in 375 cc. chloroform, are treated with a stream of gaseous HCl at room temperature for about 2 hours.

The chloroform solution is neutralized with a sodium bicarbonate solution, washed with water and dried.

The residue is crystallized from benzene or aqueous methanol. 9 g. of needle-shaped crystals, M.P. 186–188° C., are obtained. Upon concentrating the mother-liquor, 3.2 g. of a product having a M.P. of 180–184° C. are recovered.

λ max. 256 mμ, ε=13.160

EXAMPLE 2

4-chloro-testosterone

Example 1 is repeated, except that the chloroform is substituted by methylene chloride containing 3% methanol.

EXAMPLE 3

4-chloro-testosterone

Example 1 is repeated except that the saturation with gaseous HCl is carried out at −10° C. for 2 hours.

EXAMPLE 4

4-chloro-testosterone-acetate

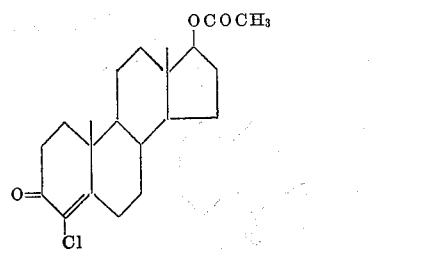

5 g. 4β,5-epoxy-etiocholane-17β-ol-3-one-acetate, M.P. 156° C., are dissolved in 125 cc. anhydrous chloroform and treated with a gaseous HCl stream at room temperature.

The solution becomes yellow-green and subsequently dark and turbid. After 2 hours the organic solution is washed first with a sodium bicarbonate solution and then with water, and is finally evaporated to dryness whereby the drying is completed under vacuum.

The residue is taken up with 400 cc. hot methanol, and the solution is cooled and filtrated. 3.3 g. 4-chloro-testosterone-acetate are obtained, M.P. 228–230° C., λ max. 255 mμ, ε=13,300, [α]$_D$=+118° ±4° (in chloroform).

0.5 g. of a product having a M.P. of 215–220° C. is recovered upon concentrating the filtrate.

EXAMPLE 5

*4-chloro-testosterone-acetate*

4 g. 4β,5-epoxy-etiocholane - 17β - ol - 3 - one - acetate, M.P. 156° C., are refluxed with 50 cc. of a 1.2/N solution of pyridinium chloride in chloroform for 5 hours. The organic solution is washed with diluted hydrochloric acid, sodium bicarbonate and water and is finally evaporated to dryness.

The crystalline residue, M.P. 220–228° C., consists of almost pure 4-chloro-testosterone-acetate. After a recrystallization the product melts at 228–230° C.

EXAMPLE 6

*4-chloro-testosterone-acetate*

2 g. 4α,5-epoxy-androstane-17β-ol-3-one-acetate M.P. 170–172° C., dissolved in 50 cc. anhydrous chloroform, are treated with anhydrous HCl for 2 hours at room temperature. The solution becomes pale-yellow without any further darkening. The solution is neutralized by washing and concentrated. The residue obtained upon evaporation is recrystallized from methanol and 1.5 g. 4-chloro-testosterone-acetate, M.P. 226–228° C., are obtained.

EXAMPLE 7

*4-chloro-testosterone-acetate*

1 g. 4α,5-epoxy-androstane-17β-ol-3-one-acetate are boiled for 8 hours in 15 cc. of a 1.2/N solution of pyridinium chloride in coloroform.

The resulting solution is washed with dil. hydrochloric acid, diluted alkali, water and is finally reduced to dryness. An almost quantitative yield of 4-chloro-testosterone-acetate is obtained.

EXAMPLE 8

*4-chloro-testosterone-acetate*

1 g. 4-chloro-testosterone are acetylated with 1 cc. acetic anhydride and 5 cc. pyridine at room temperature for 16 hours. Ice is added to the solution, and the precipitate is filtered off and recrystallized from chloroform-ethanol; 1 g. 4-chlorotestosterone-acetate, M.P. 228–230° C., is obtained.

EXAMPLE 9

*4-chloro-testosterone-propionate*

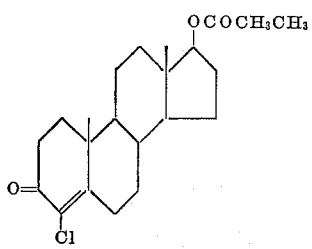

3 g. 4β-5-epoxy-etiocholane-17β-ol-3-one-propionate, M. P. 158–160° C., dissolved in 120 cc. chloroform, are treated with anhydrous HCl for 10 minutes. At the conclusion of the aforementioned operation steps, the residue is crystallized from methanol. 2 g. chloro-testosterone-propionate, M.P. 164–165° C., are obtained.

EXAMPLE 10

*4-chloro-testosterone-emisuccinate*

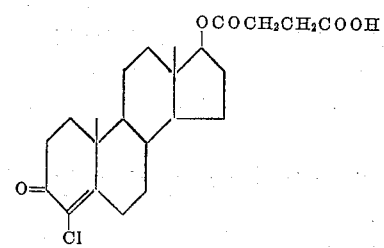

0.7 g. 4-chloro-testosterone, M.P. 188° C., are treated with 7 cc. pyridine and 1.2 g. succinic anhydride at 70° C. for 5 hours. After pouring the solution into ice-cold water, extracting with benzene and treating the extract with diluted hydrochloric acid, washing with water and drying by evaporation, the residue is crystallized from aqueous methanol. 0.4 g. of crystals, M.P. 203–204° C., [α]$_D^{22}$=116° ±4, are obtained.

EXAMPLE 11

*4-chloro-testosterone-palmitate*

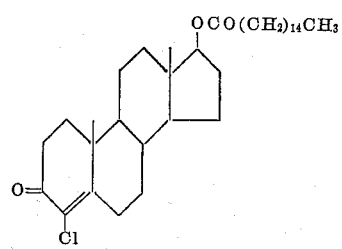

1 g. 4-chloro-testosterone, dissolved in 10 cc. benzene and 3 cc. pyridine, are treated with 1.3 g. palmityl chloride at −10° C. and left standing at room temperature for 12 hours. The solution is then diluted with benzene, and washed with diluted HCl, diluted NaOH and water. The benzene is evaporated and the residue is recrystallized from methanol. 0.8 g. 4-chloro-testosterone-palmitate, M.P. 56° C., are obtained.

EXAMPLE 12

*4-chloro-17α-methyl-testosterone*

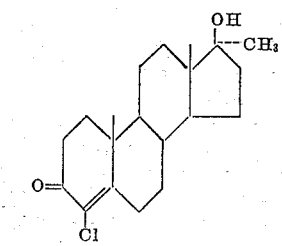

3 g. 4α,5 - epoxy - 17 - methyl-androstane-17β-ol-3-one, M.P. 80–82° C., [α]$_D$=+ 12° ±4°, dissolved in 90 cc. chloroform and 9 cc. ethanol, are treated with anhydrous HCl until the solution is saturated. After standing for 15 min., the solution is washed with water and dried by distilling off the solvent. The residue is chromatographically fractionated on 90 g. Florisil and the fractions eluted with ether are recrystallized from ether. 2.2 g. 4-chloro-17α-methyl-testosterone are obtained, M.P. 148–150° C., λ max. 256 mμ, ε=14.000.

EXAMPLE 13

*4-chloro-Δ⁴-androstene-3,17-dione*

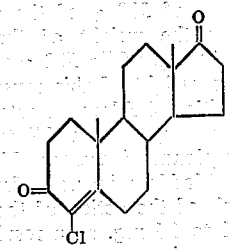

2 g. 4-chloro-testosterone dissolved in 20 cc. pyridine are treated, at room temperature, with a suspension of 1 g. $CrO_3$ in 20 cc. pyridine. After 24 hours the reaction mixture is diluted with benzene, washed with diluted hydrochloric acid, diluted NaOH and water and is finally dried.

The solvent is evaporated and the residue is crystallized from aqueous methanol. 0.7 g. 4-chloro-Δ⁴-androstene-3,17-dione are obtained, M.P. 175° C., $[\alpha]_D^{22}=+218°\pm4°$.

EXAMPLE 14

*4-chloro-adrenosterone*

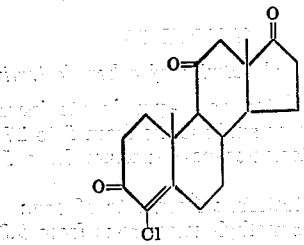

0.2 g. of a mixture of 4β,5-epoxy-etiocholane-3,11,17-trione and 4α,5-epoxy-androstane-3,11,17-trione (obtained by epoxidizing 0.2 g. adrenosterone with $H_2O_2$ and NaOH) are dissolved in 15 cc. chloroform and 1.5 cc. ethanol and for 30 minutes treated with anhydrous HCl. After recovery in the usual manner the residue is recrystallized from ether. 90 mg. 4-chloro-adrenosterone are obtained, M.P. 175–177° C., λ max. 255 mμ, ε=11.630.

EXAMPLE 15

*4-chloro-Δ⁴-androstene-3β-17β-diol*

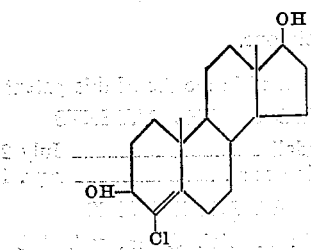

2 g. 4-chloro-testosterone, dissolved in 120 cc. pure methanol, are cooled to −5° C. and treated for 2 hours with 0.5 g. $NaBH_4$ at +5° C. After a short time, a voluminous crystalline precipitate appears in the solution. This precipitate is extracted with methylene chloride and washed with diluted hydrochloric acid and water. 1.7 g. residue, M.P. about 140° C., are obtained. After recrystallization from methanol, the melting point of the product is 252° C.; $[\alpha]_D^{22}=+114°\pm4°$. No ultraviolet absorption between 220 and 300 mμ.

By acetylation with a mixture of acetic anhydride and pyridine, the 4-chloro-Δ⁴-androstene-3β-17β-diol-diacetate is obtained which, when recrystallized from methanol, melts at 150° C., $[\alpha]_D^{23}=+56°\pm4°$.

EXAMPLE 16

*4-fluoro-testosterone-acetate*

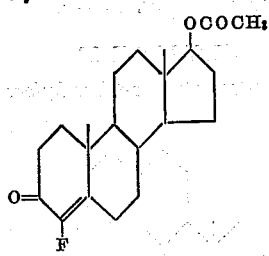

1 g. 4,5β-epoxy-etiocholane-17β-ol-3-one-acetate, dissolved in 30 cc. chloroform and 30 cc. absolute ethanol, are treated with anhydrous HF for 1 hour. A 2 N NaOH solution is then added until the solution is only slightly acid. The precipitate is separated, washed with $H_2O$, dried and the solvent contained therein is distilled off. Upon recrystallization from ether, 190 mg. 4-fluoro-testosterone-acetate are obtained; M.P. 178–180° C., λ max. 241 mμ, ε=11.670.

EXAMPLE 17

*4-fluoro-testosterone-propionate*

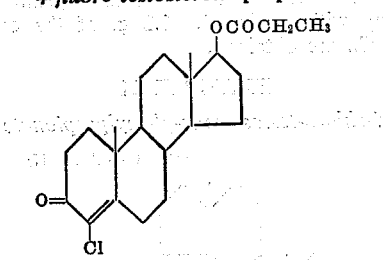

Proceeding as in Example 16, but starting with the 4β,5-epoxyetiocholane-17β-ol-3-one-propionate, 4-fluoro-testosterone-propionate is obtained by recrystallization from petroleum, M.P. 128–130° C., λ max. 243 mμ, ε=12.300.

EXAMPLE 18

*4-chloro-testosterone-acetate-oxime*

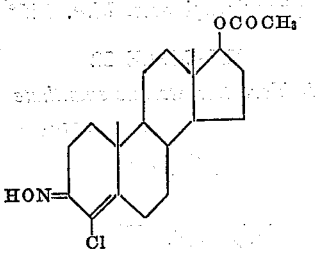

1 g. 4-chloro-testosterone-acetate are refluxed for 2 hours with 3 g. hydroxylamine hydrochloride, 250 cc. absolute ethanol, 1 cc. pyridine and 5 cc. acetic acid. The solution is then concentrated and the precipitate is recrystallized from ethyl alcohol. 0.7 g. of the oxime are obtained, M.P. 204–205° C. (decomposition).

EXAMPLE 19

*4-chloro-testosterone-acetate-thiosemicarbazone*

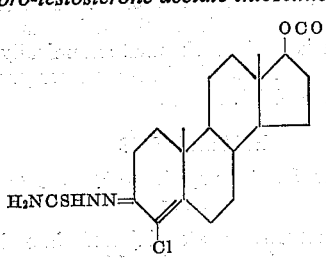

1 g. 4-chloro-testosterone-acetate are refluxed for 16 hours with 0.6 g. thiosemicarbazide and 90 cc. ethanol.

EXAMPLE 20

*4-chloro-testosterone-trimethylacetate*

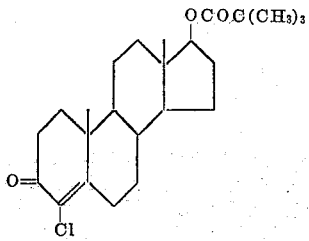

2 g. 4-chloro-testosterone are dissolved in 50 cc. anhydrous methylene chloride and 2 cc. pyridine, and are treated with 1.5 trimethylacetyl chloride dissolved in 50 cc. methylene chloride, first at —20° C. for 1 hour and then at room temperature for 15 hours. The solution is washed with ice-cold water, diluted hydrochloric acid, diluted NaOH solution and water until neutral. The solvent is then evaporated and the crystalline residue is taken up with methanol. 1.2 g. of the ester, M.P. 200–202° C., are obtained.

EXAMPLE 21

*4-chloro-testosterone-phenylpropionate*

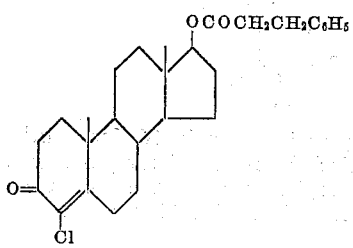

2 g. 4-chloro-testosterone are esterified with 2 g. phenylpropionyl acid chloride as described in Example 20. 1.7 g. of the phenylpropionate, M.P. 145° C., are obtained.

EXAMPLE 22

*4-chloro-testosterone-enanthate*

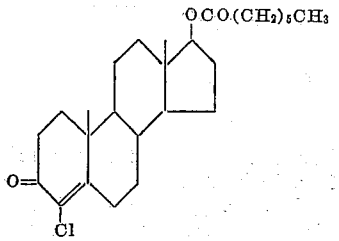

1 g. 4-chloro-testosterone dissolved in 5 cc. pyridine are heated for 5 hours to 90° C. with 2 g. enanthic anhydride. The solution is diluted with water, and extracted with benzene. The benzene extract is washed with diluted hydrochloric acid, diluted NaOH solution and water until neutral. The solvent is evaporated and the oily residue is purified chromatographically on silica gel. The fraction eluted with benzene-ether produces 1.1 g. of the enanthate, M.P. 59° C.

EXAMPLE 23

*Pharmacological activity of the 4-chloro-testosterone-acetate*

4-chloro-testosterone-acetate, injected into impuberal rats castrated according to the Hershberger et al. method (Proc. Soc. Exp. Biol. and Med. 83, 175 (1953)), shows high anabolic activity coupled with poor androgen activity.

Thus, a daily dose of 500 γ of the afore-mentioned compound increases the weight of the "levator ani" muscle from 5 to 42 mg. while 500 γ testosterone propionate increase the weight of this muscle to 28.5 mg. Under similar condition 4-chloro-testosterone-acetate increases the prostate weight from 6.7 to 48 mg. while the testosterone-propionate increases this weight to 90 mg. The seminal bladders increase from 4.1 mg. to 36.5 mg. as a result of the action of the 4-chloro-testosterone-acetate and to 96 mg. as a result of the action of the testosterone-propionate.

Consequently, the ratio between the anabolic and the androgen activity, calculated according to Hershberger et al., is 0.88 for 4-chloro-testosterone-acetate and 0.28 for testosterone-propionate.

4-chloro-testosterone-acetate is still active in doses as little as 250 γ and 100 γ per day.

The toxicity of 4-chloro-testosterone-acetate is low: a dose of 1.5 g./kg. administered by one subcutaneous injection of the aqueous solution is readily tolerated by rats.

Doses of 50 mg./kg. a day for 10 days are also well tolerated by rats while a dose 10 times as great may be considered the maximum dose tolerated upon continuous administration.

EXAMPLE 24

*Pharmacological activity of other derivatives*

The 4-chloro-testosterone-propionate increases the weight of the "levator ani" muscle from 5 to 27 mg.;

The 4-hydroxy-testosterone-17-acetate from 5 to 20.5 mg.;

The 4-chloro-testosterone from 5 to 19 mg.;

The 4-chloro-17α-methyl-testosterone from 9.8 to 24.5 mg.;

The 4-fluoro-testosterone-propionate from 7.9 to 20 mg.

The 4-chloro-testosterone-propionate increases the weight of the prostate from 6.7 to 43 mg. (ratio between anabolic and androgen activity 0.61); the 4-hydroxy-testosterone-17-acetate from 6.7 to 32 mg. (ratio as above mentioned, 0.61);

The chloro-testosterone from 6.7 to 31.5 mg. (ratio, as above-mentioned, 0.57),

The 4-chloro-17α-methyl-testosterone from 4.2 to 48.7 mg. (ratio, as afore-mentioned, 0.35);

The 4-fluoro-testosterone-propionate from 5.2 to 39.2 mg. (ratio, as afore-mentioned, 0.35).

I claim:
4-chloro-adrenosterone.

References Cited in the file of this patent

UNITED STATES PATENTS

| | | |
|---|---|---|
| 2,845,381 | Tindall | July 29, 1958 |
| 2,933,510 | Julian et al. | Apr. 19, 1960 |

OTHER REFERENCES

Kochakian et al.: J. Biol. Chem. vol. 122 (1938), pages 433–438 (page 433 necessary).

Cavallini et al.: Boll., Soc. Ital. Biol. Sper., vol. 27 (1951), pages 629–30; abstracted in Chem. Abst., vol. 48 (1954), column 866 f.

Bremer: "Congress Handbook, XIVth Internat. Congr., Pure and Applied Chemistry" (Zurich, Switz.: Berichthaus Zurich, 1955) pages 162 and 163.

Kirk et al.: J. Chem. Soc. (March 1956), pages 627–629.

Kirk et al.: J. Chem. Soc. (May 1956), pages 1184–1186.

Camerino et al.: J. Am. Chem. Soc., vol. 78 (July 20, 1956), pages 3540 and 3541.